(12) United States Patent
Stretch

(10) Patent No.: US 8,794,104 B2
(45) Date of Patent: Aug. 5, 2014

(54) THERMAL RATCHET SYSTEM

(75) Inventor: Mitchel Stretch, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 360 days.

(21) Appl. No.: 13/280,056

(22) Filed: Oct. 24, 2011

(65) Prior Publication Data
US 2013/0098028 A1 Apr. 25, 2013

(51) Int. Cl.
G05G 1/00 (2008.04)
F03G 7/06 (2006.01)

(52) U.S. Cl.
CPC .................................... F03G 7/06 (2013.01)
USPC ........................................................ 74/578

(58) Field of Classification Search
USPC ........ 74/128, 132, 575, 578; 60/529; 166/237
See application file for complete search history.

(56) References Cited

U.S. PATENT DOCUMENTS

| 2,207,448 | A | * | 7/1940 | Ashbrook | 166/135 |
|---|---|---|---|---|---|
| 3,803,845 | A | | 4/1974 | Dennis | |
| 4,337,622 | A | | 7/1982 | Johnson | |
| 4,619,320 | A | * | 10/1986 | Adnyana et al. | 166/66.7 |
| 5,010,764 | A | | 4/1991 | Taylor | |
| 5,010,958 | A | * | 4/1991 | Meek et al. | 166/382 |
| 6,564,871 | B1 | * | 5/2003 | Roberts | 166/313 |
| 2012/0125640 | A1 | * | 5/2012 | Sevre | 166/387 |

* cited by examiner

Primary Examiner — Vicky Johnson
(74) Attorney, Agent, or Firm — Daren C. Davis; Wayne I. Kanak

(57) ABSTRACT

A thermal ratchet system includes a ratchet housing, a ratchet mandrel, a first ratchet, and a second ratchet. The first ratchet is disposed at a position generally fixed with respect to the ratchet housing and is urgeable with respect to the ratchet mandrel in an axial direction by a change in environmental temperature in a first direction. The second ratchet is disposed at a position generally fixed with respect to the ratchet housing and is urgeable with respect to the ratchet mandrel in the axial direction by a change in environmental temperature in a second direction opposite to the first direction. At least one of the first ratchet and the second ratchet is engaged with the ratchet mandrel.

13 Claims, 11 Drawing Sheets

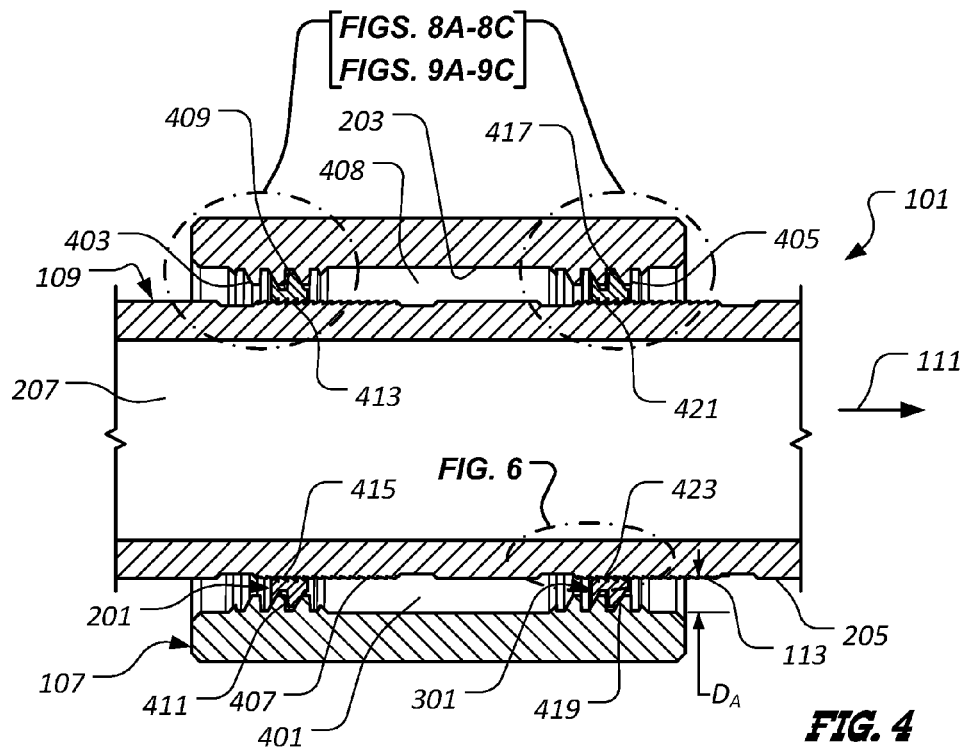
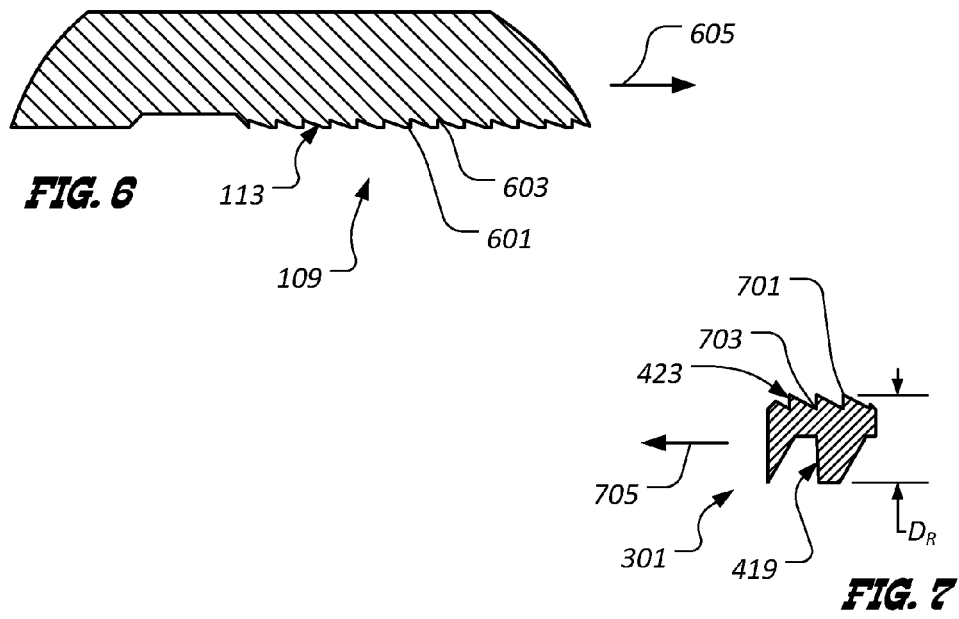

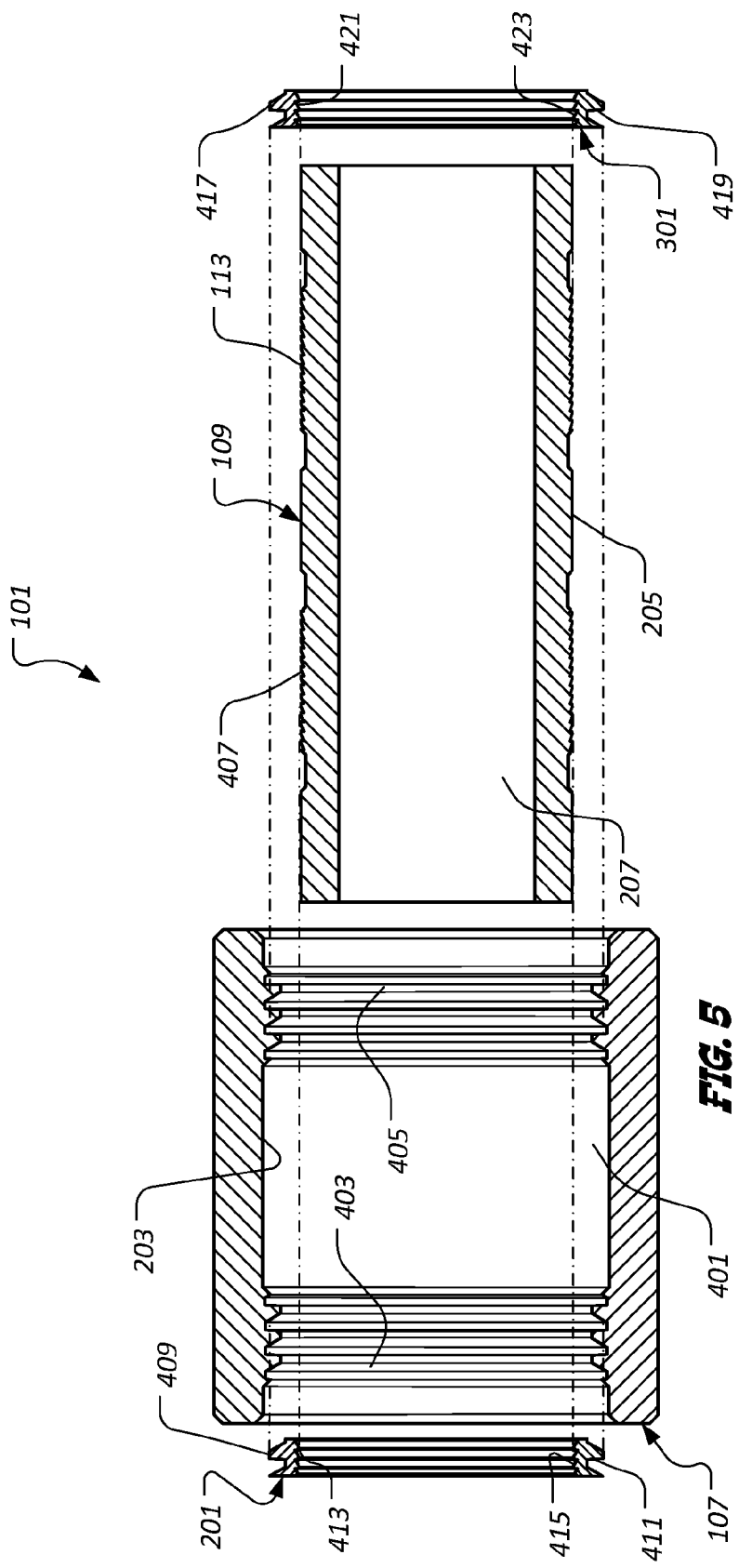

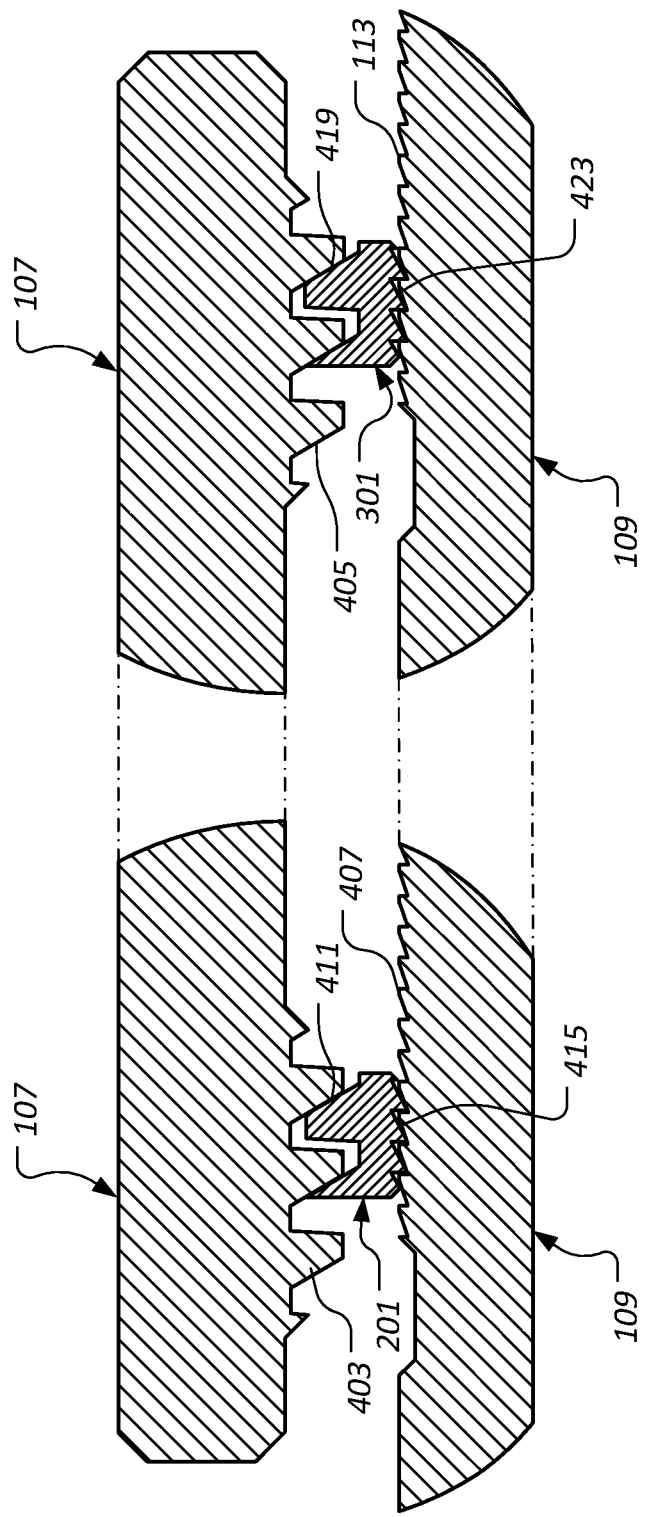

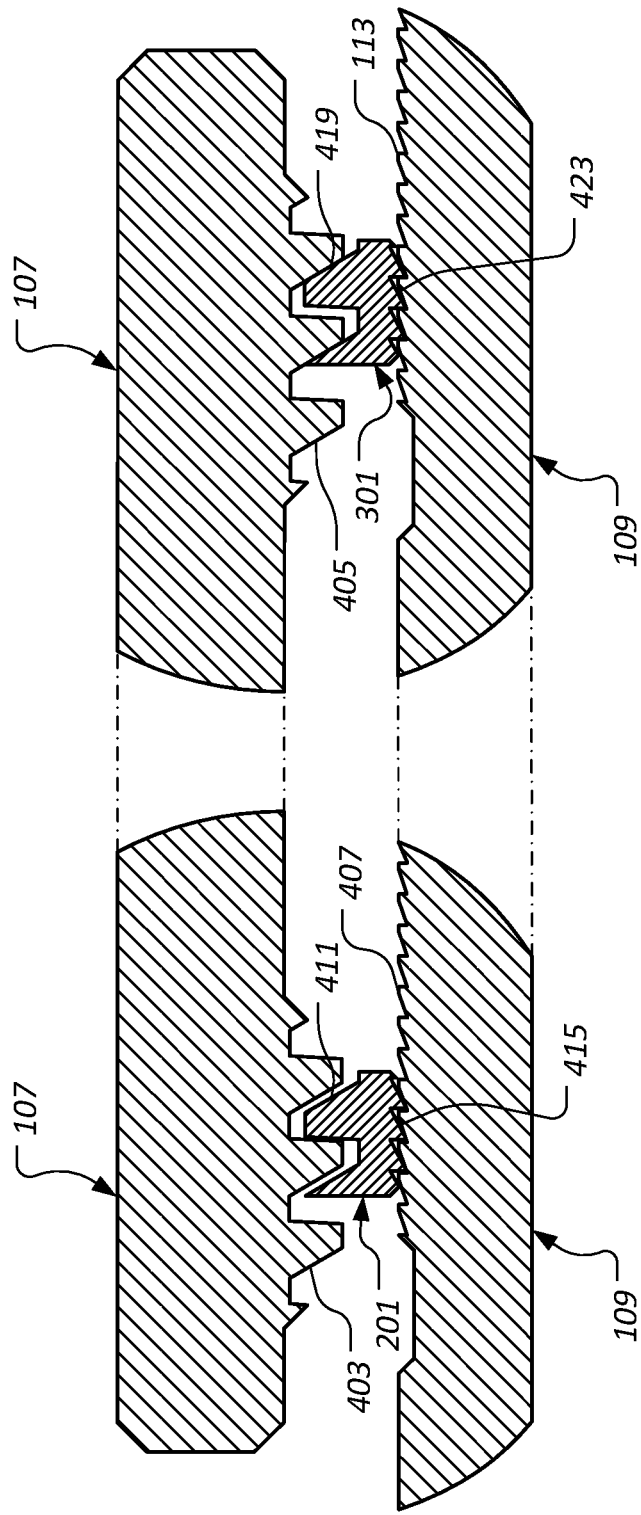

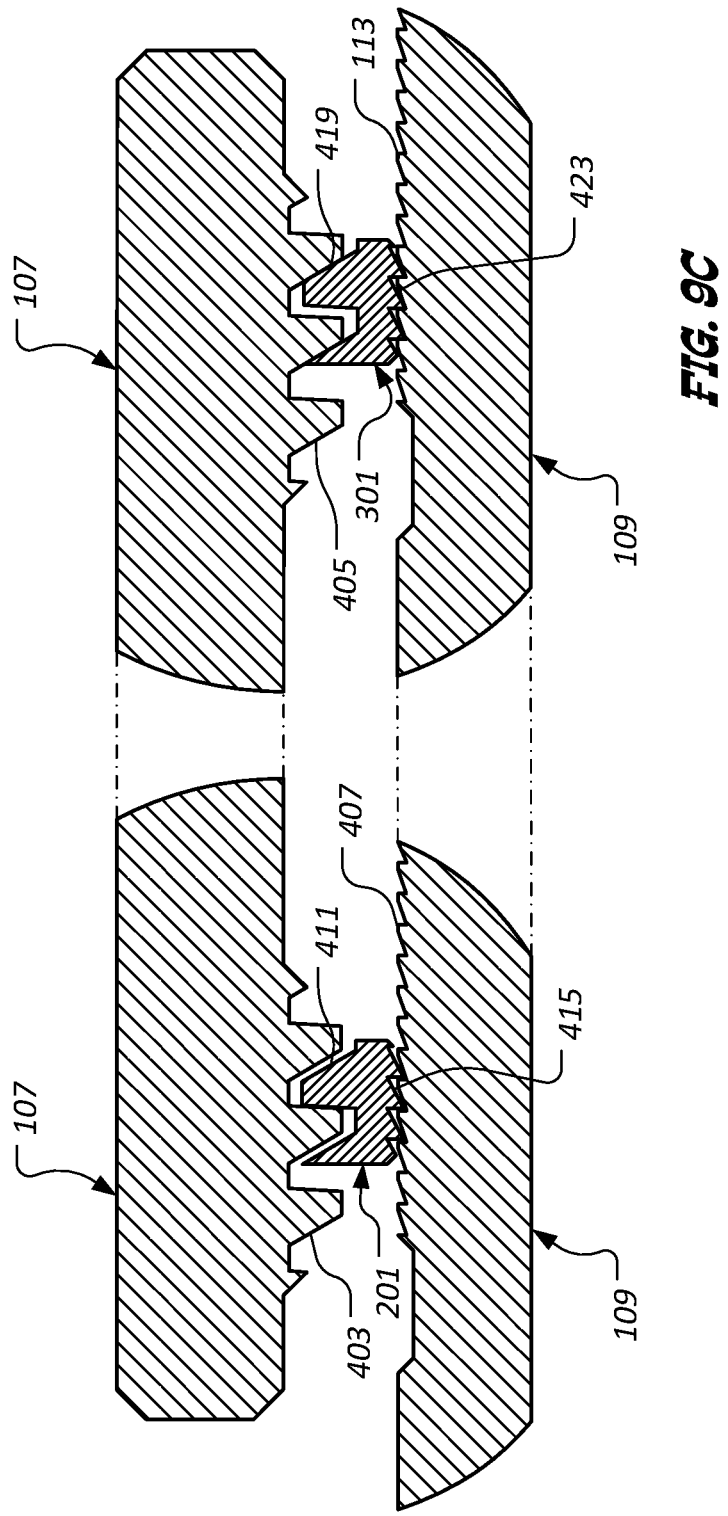

THERMAL RATCHET SYSTEM

BACKGROUND

Mechanical equipment is often subjected to considerable mechanical stress when operated in environments wherein temperatures are cyclic. In such environments, for example, components that are made from materials that exhibit larger coefficients of thermal expansion change dimensions as a result of temperature fluctuations to a greater degree than other components that are formed from materials exhibiting smaller thermal expansion coefficients. Mechanically coupling components made from materials exhibiting different coefficients of thermal expansion can cause many such components to fail. These disparate changes in dimension can be particularly damaging when the changes are repeated over a period of time.

Seals, such as those utilized in downhole oilfield operations, for example, are particularly susceptible to failure when operated in environments wherein temperatures are cyclic. Components often referred to as "energizers" are used to bias seals against sealing surfaces. The energizers will expand as the temperatures of the environments in which they are operated increase and contract as the temperatures decrease. Often, the mechanical stresses induced in the energizers by repeated changes in temperature result in the energizers being plastically, rather than merely elastically, deformed. As a result, the biasing forces provided by the energizers are decreased, thus compromising the efficiencies of the seals.

BRIEF SUMMARY

A thermal ratchet system includes a ratchet housing, a ratchet mandrel, a first ratchet, and a second ratchet. The first ratchet is disposed at a position generally fixed with respect to the ratchet housing and is urgeable with respect to the ratchet mandrel in an axial direction by a change in environmental temperature in a first direction. The second ratchet is disposed at a position generally fixed with respect to the ratchet housing and is urgeable with respect to the ratchet mandrel in the axial direction by a change in environmental temperature in a second direction opposite to the first direction. At least one of the first ratchet and the second ratchet is engaged with the ratchet mandrel.

In one aspect, the thermal ratchet system comprises a ratchet housing, comprising a material exhibiting a first coefficient of thermal expansion, that defines a first locking profile and a second locking profile. The thermal ratchet system further comprises a ratchet mandrel, comprising a material exhibiting a second coefficient of thermal expansion different from the first coefficient of thermal expansion, that defines a first ratcheting profile and a second ratcheting profile. The thermal ratchet system further comprises a first ratchet defining a locking profile operably associated with the first locking profile of the ratchet housing and a ratcheting profile operably associated with the first ratcheting profile of the ratchet mandrel. The thermal ratchet system yet further comprises a second ratchet defining a locking profile operably associated with the second locking profile of the ratchet housing and a ratcheting profile operably associated with the second ratcheting profile of the ratchet mandrel.

Certain embodiments provide significant advantages, including, for example, providing a way to maintain the initial load or increase and hold a higher load applied through mechanically coupled components.

Additional features and advantages will be apparent in the written description which follows.

BRIEF DESCRIPTION OF THE DRAWINGS

The features of the invention are set forth in the appended claims. However, the invention itself, as well as a preferred mode of use, will be best understood by reference to the following detailed description when read in conjunction with the accompanying drawings, in which the leftmost significant digit(s) in the reference numerals denote(s) the first figure in which the respective reference numeral appears, wherein:

FIG. 4 is a cross-sectional view of the thermal ratchet system embodiment of FIG. 1, taken along the line 4-4 in FIGS. 2 and 3;

FIG. 5 is an exploded, cross-sectional view of the thermal ratchet system embodiment of FIG. 1 corresponding to the view of FIG. 4;

FIG. 6 is an enlarged, cross-sectional view, as indicated in and corresponding to the view of FIG. 4, of a portion of a ratchet mandrel of the thermal ratchet system embodiment of FIG. 1;

FIG. 7 is an enlarged, cross-sectional view, corresponding to the view of FIG. 4, of a portion of a ratchet of the thermal ratchet system embodiment of FIG. 1;

FIGS. 8A-8C and 9A-9C are enlarged, cross-sectional views, as indicated in and corresponding to the view of FIG. 4, of portions of a ratchet housing, the ratchet mandrel, and ratchets of the thermal ratchet system of FIG. 1, illustrating exemplary operations of the thermal ratchet system.

Figure 1:
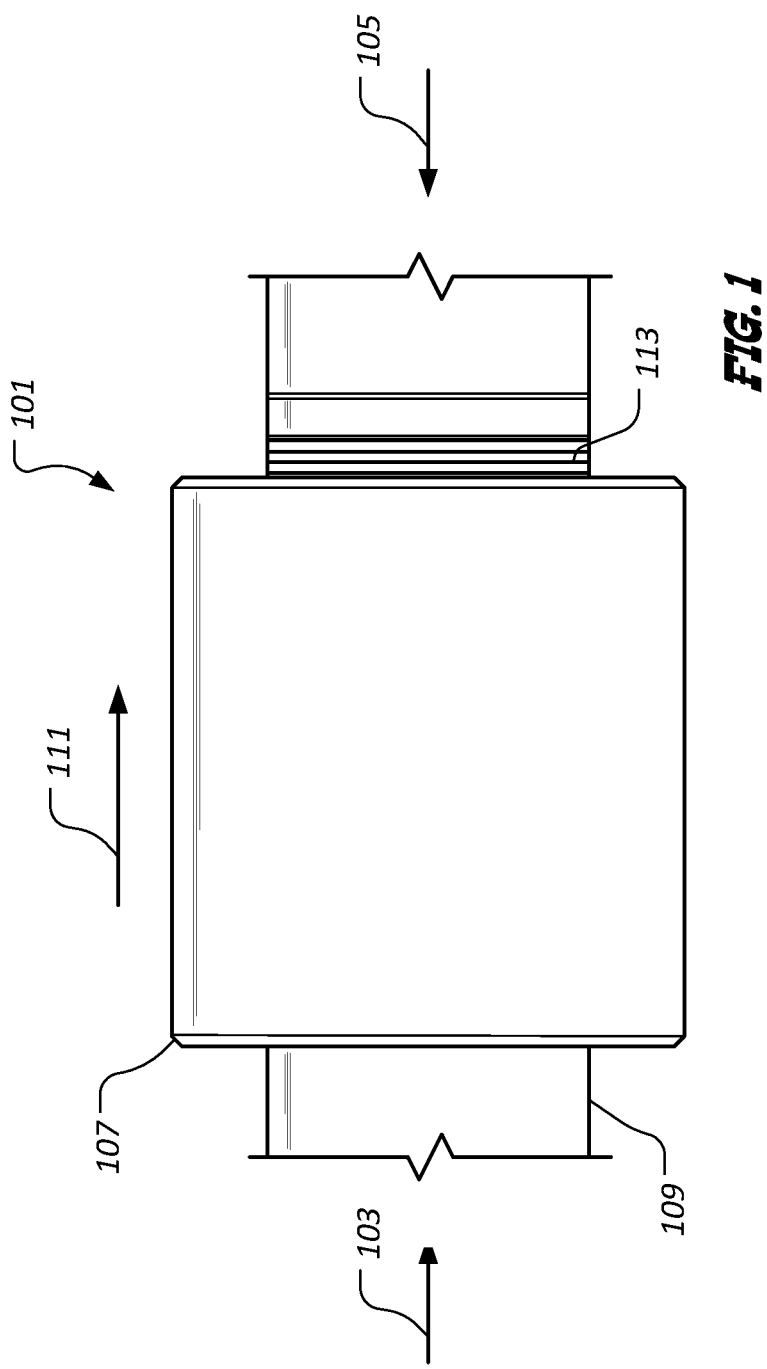
FIG. 1 is a top, plan view of a first illustrative embodiment of a thermal ratchet system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention relates to a thermal ratchet system configured to compensate for dimensional changes induced by temperature variations in an environment in which the system is disposed.

Figure 2:
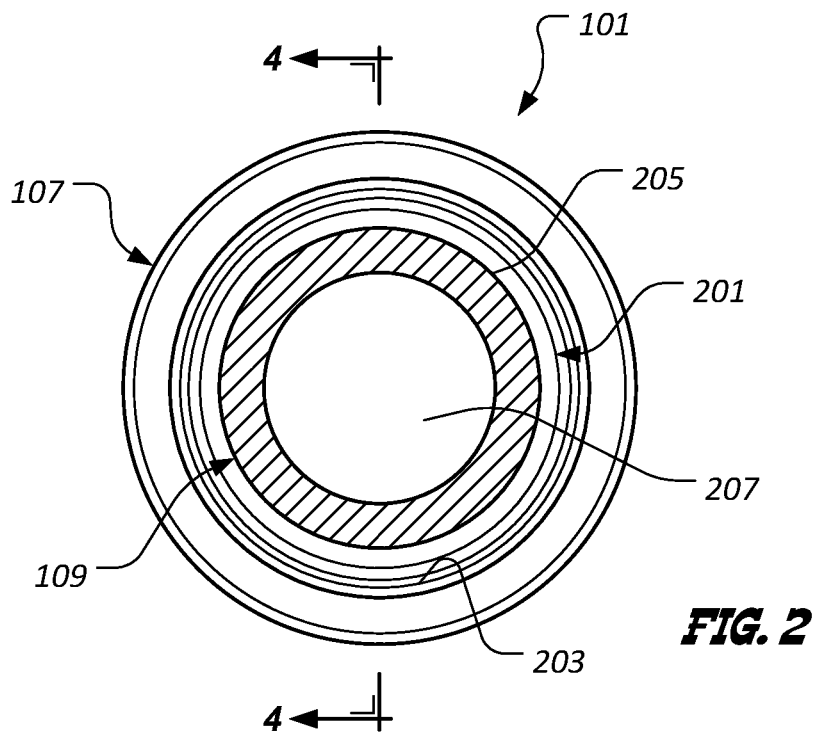
FIGS. 2 and 3 are end, elevational views of the thermal ratchet system embodiment of FIG. 1.
Figure 3:
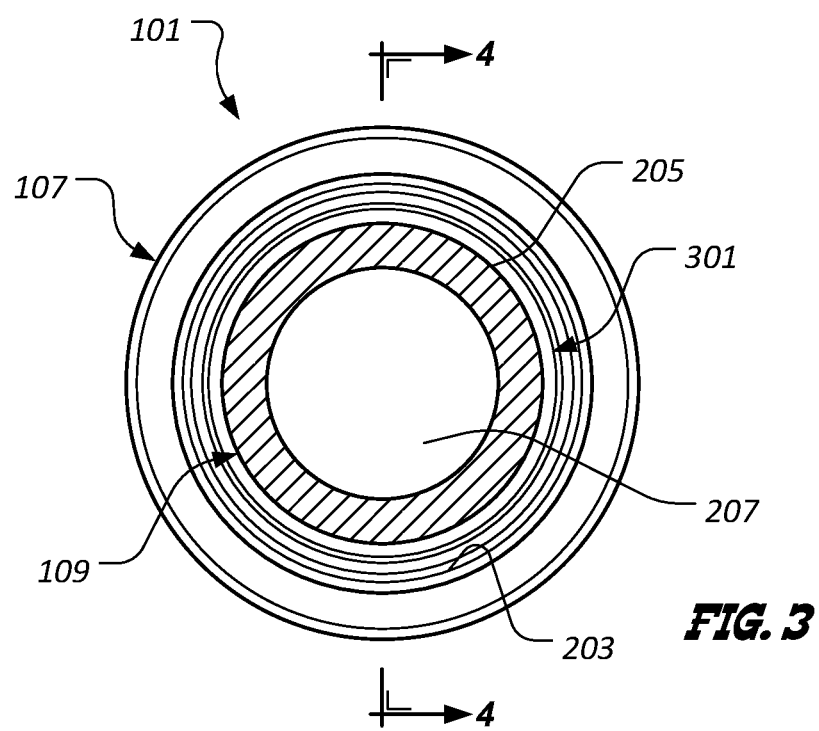

FIGS. 1-5 depict a first, illustrative embodiment of a thermal ratchet system 101. FIG. 1 is a side, elevational view of system 101. FIGS. 2 and 3 are end, elevational views of system 101. FIG. 2 is a view of system 101 looking in a direction generally corresponding to an arrow 103 in FIG. 1, while FIG. 3 is a view of system 101 looking in a direction generally corresponding to an arrow 105 in FIG. 1. FIG. 4 is a cross-sectional view of system 101 taken along the line 4-4 of FIGS. 2 and 3. FIG. 5 is an exploded, cross-sectional view of system 101, corresponding to the view of FIG. 4.

Thermal ratchet system 101, in the embodiment illustrated in FIGS. 1-5, comprises a ratchet housing 107 and a ratchet mandrel 109 comprising a material exhibiting a coefficient of thermal expansion different from the coefficient of thermal expansion exhibited by ratchet housing 107. For example, in one embodiment, ratchet housing 107 comprises a material that exhibits a greater coefficient of thermal expansion than the coefficient of thermal expansion exhibited by ratchet mandrel 109, although the scope of the invention is not so limited. In other embodiments, ratchet mandrel 109 comprises a material that exhibits a greater coefficient of thermal expansion than the coefficient of thermal expansion exhibited by ratchet housing 107. System 101 further comprises a first ratchet 201 and a second ratchet 301. Generally, first ratchet 201 and second ratchet 301 are disposed between ratchet housing 107 and ratchet mandrel 109. First ratchet 201 and second ratchet 301 are operatively associated with ratchet housing 107 and ratchet mandrel 109 to advance ratchet housing 107 along ratchet mandrel 109 as a result of temperature fluctuations of the environment in which system 101 is operated. First ratchet 201 and second ratchet 301 define locking profiles that are engaged with corresponding locking profiles defined by ratchet housing 107 that retain first ratchet 201 and second ratchet 301 in general positions with respect to ratchet housing 107. In this way, first ratchet 201 and second ratchet 301 are disposed at positions that are generally fixed with respect to ratchet housing 107. First ratchet 201 and second ratchet 301 further define ratcheting profiles that correspond with ratcheting profiles defined by ratchet mandrel 109. These ratcheting profiles are configured to allow ratchet housing 107 to advance in only generally one direction, for example in a direction generally represented by an arrow 111, shown in FIGS. 1 and 4, along ratchet mandrel 109 as a result of temperature fluctuations experienced by system 101. When changes in temperature of the environment of system 101 result in unequal dimensional changes to ratchet housing 107 and ratchet mandrel 109, the ratcheting profile of one of first ratchet 201 and second ratchet 301 remains engaged with its corresponding ratcheting profile of ratchet mandrel 109, while the other of first ratchet 201 and second ratchet 301 moves with respect to ratchet mandrel 109 to accommodate the unequal dimensional change. Depending upon the amount of unequal dimensional change, the ratcheting profile of the other of first ratchet 201 and second ratchet 301, i.e., the "moved" ratchet, engages with another portion of the corresponding ratcheting profile of ratchet mandrel 109.

Referring now in particular to FIGS. 4 and 5, ratchet housing 107 comprises an inner surface 203 defining a bore 401 extending through ratchet housing 107. Inner surface 203 of ratchet housing 107 defines a first locking profile 403 and a second locking profile 405. Ratchet mandrel 109 comprises an outer surface 205 defining a first ratcheting profile 407 and a second ratcheting profile 113. Inner surface 203 of ratchet housing 107 and outer surface 205 of ratchet mandrel 109 define an annulus 408. In some embodiments, ratchet mandrel 109 further defines a bore 207 extending therethrough for the passage of a material or materials. First ratchet 201 comprises an outer surface 409 defining a locking profile 411 and an inner surface 413 defining a ratcheting profile 415. Similarly, second ratchet 301 comprises an outer surface 417 defining a locking profile 419 and an inner surface 421 defining a ratcheting profile 423. Locking profile 411 of first ratchet 201 interfaces or generally engages first locking profile 403 of ratchet housing 107. Similarly, locking profile 419 of second ratchet 301 interfaces or generally engages second locking profile 405 of ratchet housing 107. Ratcheting profile 415 of first ratchet 201 interfaces, at times, with first ratcheting profile 407 of ratchet mandrel 109, while ratcheting profile 423 of second ratchet 301 interfaces, at times, with second ratcheting profile 113 of ratchet mandrel 109. First ratchet 201 and second ratchet 301 each exhibit a cross-sectional dimension, such as a cross-sectional dimension $D_R$ of second ratchet 301 (shown in FIG. 7), that is less than a corresponding cross-sectional dimension $D_A$ of annulus 408 to allow first ratchet 201 and second ratchet 301 to engage and disengage ratcheting profiles 407 and 113, respectively, as is discussed in greater detail herein. Ratchet mandrel 109, first ratchet 201, and second ratchet 301 are disposed in bore 401 of ratchet housing 107, such that ratchet housing 107 and ratchet mandrel 109 are operably associated with first ratchet 201 and second ratchet 301.

Ratcheting profiles 415 and 423 of ratchets 201 and 301, respectively, and ratcheting profiles 113 and 407 of ratcheting mandrel 109 are configured to allow ratchet housing 107 to move in one, generally longitudinal direction along ratcheting mandrel 109. FIGS. 6 and 7 depict certain features of second ratcheting profile 113 of ratchet mandrel 109 and ratcheting profile 423 of second ratchet 301, respectively, that are particularly useful in achieving this feature. FIG. 6 depicts an enlarged, cross-sectional view, corresponding to the view of FIG. 4, of the portion of ratchet mandrel 109 indicated in FIG. 4. FIG. 7 is an enlarged, cross-sectional view of second ratchet 301, corresponding to the view of FIG. 4. As seen in FIG. 6, second ratcheting profile 113 of ratchet mandrel 109 comprises a plurality of ridges 601 separated by a plurality of valleys 603. Ridges 601 are canted in a direction generally represented by an arrow 605, which generally corresponds in direction to arrow 111 (shown in FIG. 1). Referring to FIG. 7, ratcheting profile 423 of second ratchet 301 comprises a plurality of ridges 701 separated by a plurality of valleys 703. Ridges 701 are canted in a direction generally represented by an arrow 705, which is generally counter to the direction of arrow 605 and, thus, generally counter to the direction represented by arrow 111. Ridges 701 of ratcheting profile 423 of second ratchet 301 correspond to valleys 603 of second ratcheting profile 113 of ratchet mandrel 109. Valleys 703 of ratcheting profile 423 of second ratchet 301 correspond to ridges 601 of second ratcheting profile 113 of ratchet mandrel 109. As discussed herein, second ratcheting profile 113 of ratchet mandrel 109 and ratcheting profile 423 of second ratchet 301 interface. As ridges 601 and 701 are canted, movement of second ratchet 301 with respect to ratchet mandrel 109 is inhibited in a direction generally represented by arrow 705, i.e., counter to the direction generally represented by arrows 605 and 111, while movement of first ratchet 201 with respect to ratchet mandrel 109 is allowed in a direction generally represented by arrow 605, i.e., in the direction generally represented by arrow 111. It should be noted that the configuration of ratcheting profile 415 of first ratchet 201 corresponds to ratcheting profile 423 of second ratchet 301 and that the configuration of first ratcheting profile 407 of ratchet mandrel 109 corresponds to second ratcheting profile 113 to the extent necessary for first ratchet 201 and ratchet mandrel 109 to interoperate in substantially the same manner as second ratchet 301 and ratchet mandrel 109.

The particular operation of thermal ratchet system 101 is discussed with reference to FIGS. 8A-8C and 9A-9C. FIGS.

Figure 8B:
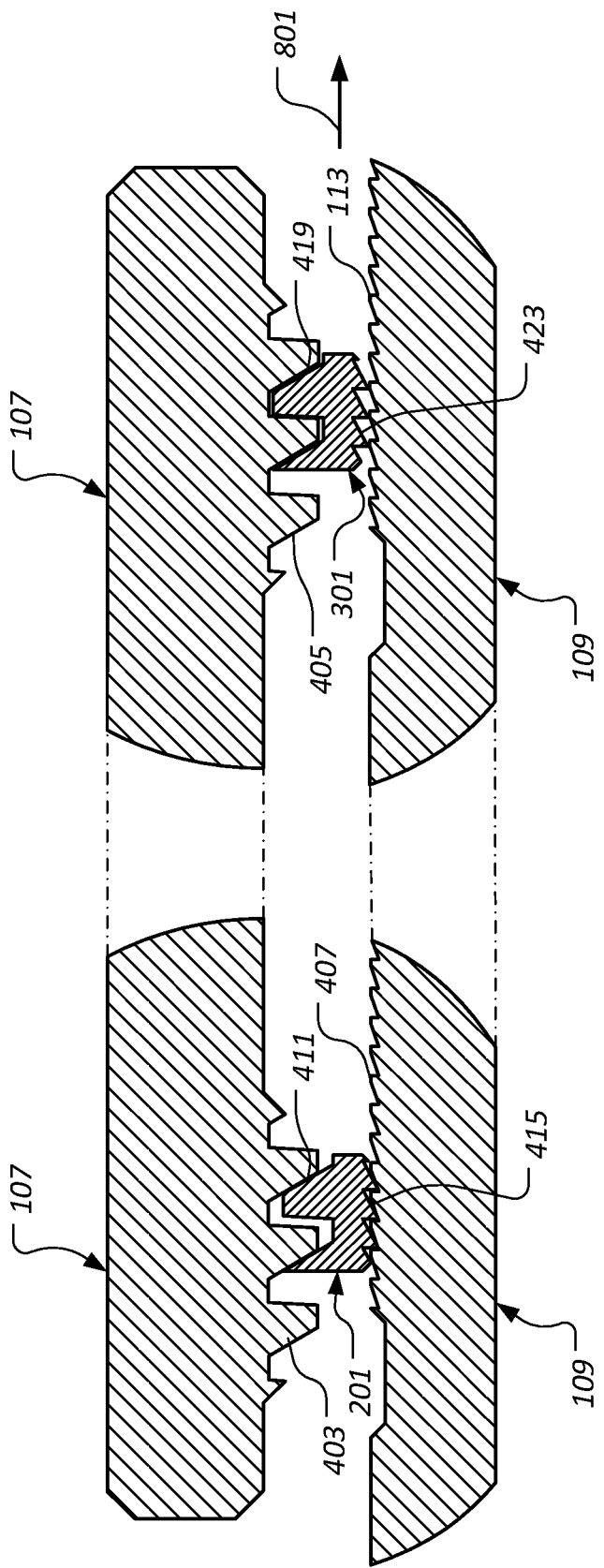
Figure 8C:
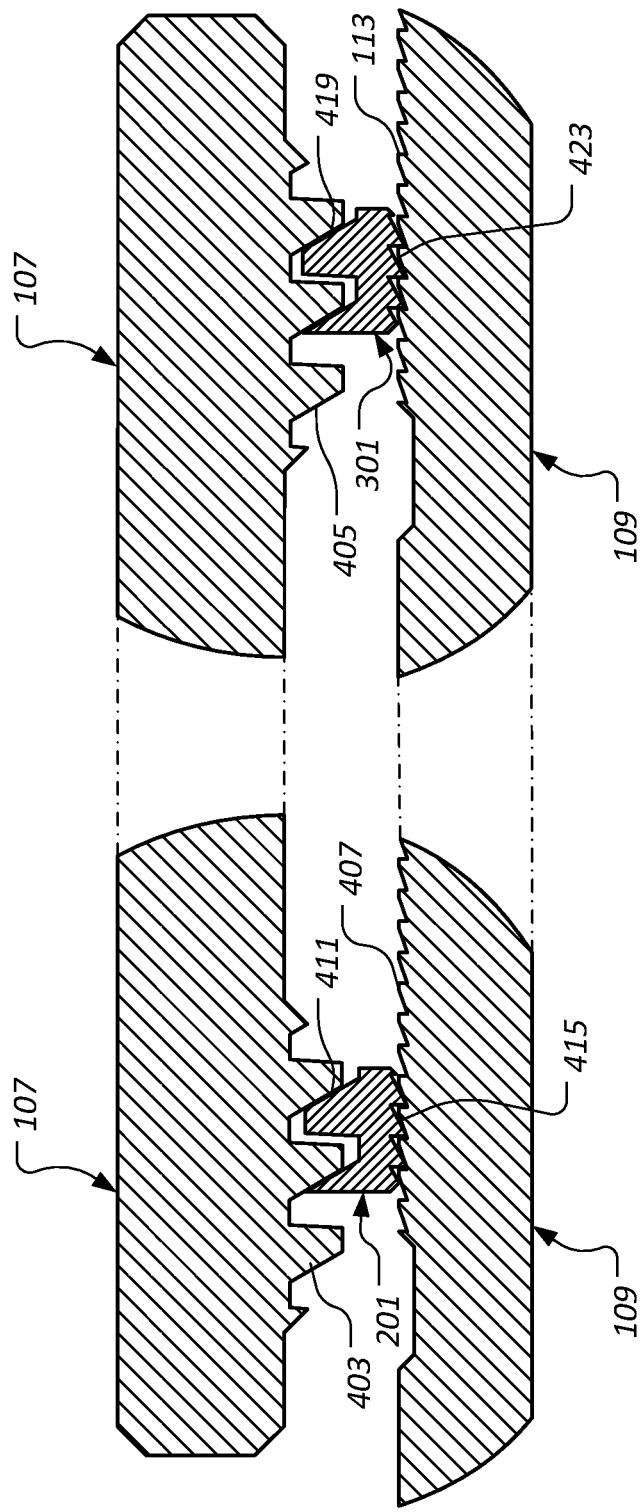
Figure 9B:
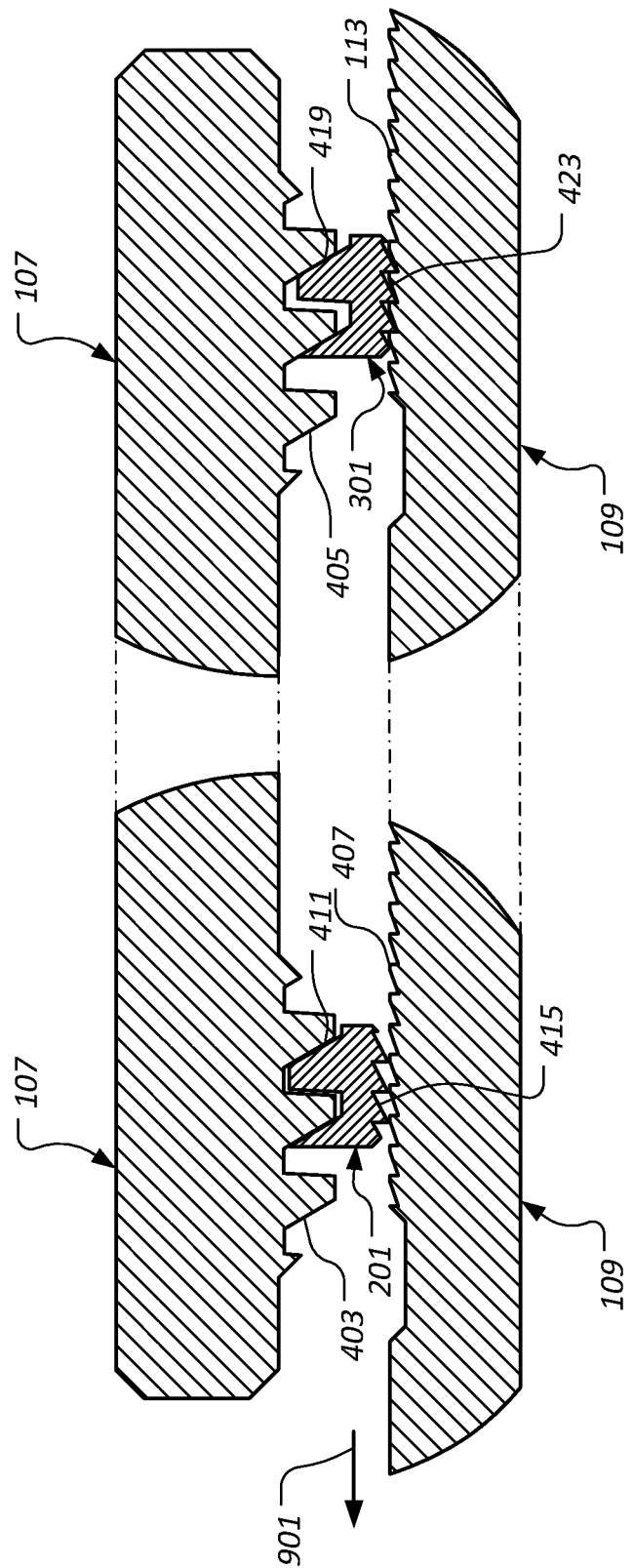

8A-8C and FIGS. 9A-9C depict, in a cross-sectional view corresponding to the view of FIG. 4, portions of ratchet housing 107, ratchet mandrel 109, and second ratchet 301. In FIGS. 8A-8C, a particular operation of thermal ratcheting system 101 is shown wherein ratchet housing 107 is expanding at a greater rate than ratchet mandrel 109 or when ratchet mandrel 109 is contracting at a greater rate than ratchet housing 107, due to a change in environmental temperature. In FIGS. 9A-9C, a particular operation of thermal ratcheting system 101 is shown wherein ratchet housing 107 is contracting at a greater rate than ratchet mandrel 109 or when ratchet mandrel 109 is expanding at a greater rate than ratchet housing 107, due to a change in environmental temperature.

Turning first to FIG. 8A, locking profile 411 of first ratchet 201 is interfaced with first locking profile 403 of ratchet housing 107, such that there is a degree of radial clearance or space between locking profiles 403 and 411 to allow a predetermined amount of radial movement of first ratchet 201 with respect to ratchet housing 107. Similarly, locking profile 419 of second ratchet 301 is interfaced with second locking profile 405 of ratchet housing 107, such that there is a degree of radial clearance or space between locking profiles 405 and 419 to allow a predetermined amount of radial movement of second ratchet 301 with respect to ratchet housing 107. In the configuration shown in FIG. 8A, ratcheting profile 415 of first ratchet 201 is engaged with first ratcheting profile 407 of ratchet mandrel 109, while ratcheting profile 423 of second ratchet 301 may be engaged, partially engaged, or disengaged with second ratcheting profile 113 of ratcheting mandrel 109. In the illustrated implementation, the environment to which system 101 is exposed experiences a change in temperature, causing ratchet housing 107 to increase in length to a greater degree than ratchet mandrel 109 or causing ratchet mandrel 109 to decrease in length to a greater degree than ratchet housing 107. As shown in FIG. 8B, the interface between ratcheting profile 415 of first ratchet 201 and first ratcheting profile 407 of ratchet mandrel 109 prevents, or at least inhibits, relative movement between first ratchet 201 and ratchet mandrel 109. However, as the relative dimensions of ratchet housing 107 and ratchet mandrel 109 change, the interface between ratcheting profile 423 of second ratchet 301 and second ratcheting profile 113 of ratchet mandrel 109 and the radial clearance between second ratchet 301 and ratchet housing 107 allows second ratchet 301 to move relative to ratchet mandrel 109 generally in a direction corresponding to an arrow 801. Specifically, as the relative dimensions of ratchet housing 107 and ratchet mandrel 109 change, ratchet housing 107 urges second ratchet 301 generally in the direction of arrow 801. As a result of the relative motion between ratchet housing 107, ratcheting profile 423 of second ratchet 301 slidingly moves along second ratcheting profile 113 of ratchet mandrel 109. If the environmental temperature change is sufficient, ratcheting profile 423 of second ratchet 301 again engages second ratcheting profile 113 of ratchet mandrel 109, as shown in FIG. 8C.

An exemplary operation of system 101 is now provided with reference to FIGS. 9A-9C, wherein ratchet housing 107 is contracting at a greater rate than ratchet mandrel 109 or when ratchet mandrel 109 is expanding at a greater rate than ratchet housing 107, due to a change in environmental temperature. Turning first to FIG. 9A, locking profile 411 of first ratchet 201 is interfaced with first locking profile 403 of ratchet housing 107, such that there is a degree of radial clearance or space between locking profiles 403 and 411 to allow a predetermined amount of radial movement of first ratchet 201 with respect to ratchet housing 107, as in the operation of system 101 shown in FIGS. 8A-8C. Similarly, locking profile 419 of second ratchet 301 is interfaced with second locking profile 405 of ratchet housing 107, such that there is a degree of radial clearance or space between locking profiles 405 and 419 to allow a predetermined amount of radial movement of second ratchet 301 with respect to ratchet housing 107. In the configuration shown in FIG. 9A, ratcheting profile 415 of first ratchet 201 is engaged, partially engaged, or disengaged with first ratcheting profile 407 of ratchet mandrel 109, while ratcheting profile 423 of second ratchet 301 is engaged with second ratcheting profile 113 of ratcheting mandrel 109. In the illustrated implementation, the environment to which system 101 is exposed experiences a change in temperature, causing ratchet housing 107 to decrease in length to a greater degree than ratchet mandrel 109 or causing ratchet mandrel 109 to increase in length to a greater degree than ratchet housing 107. As shown in FIG. 9B, the interface between ratcheting profile 423 of second ratchet 301 and second ratcheting profile 113 of ratchet mandrel 109 prevents, or at least inhibits, relative movement between second ratchet 301 and ratchet mandrel 109. However, as the relative dimensions of ratchet housing 107 and ratchet mandrel 109 change, the interface between ratcheting profile 415 of first ratchet 201 and first ratcheting profile 407 of ratchet mandrel 109 and the radial clearance between first ratchet 201 and ratchet housing 107 allows first ratchet 201 to move relative to ratchet mandrel 109 generally in a direction corresponding to an arrow 901. Specifically, as the relative dimensions of ratchet housing 107 and ratchet mandrel 109 change, ratchet housing 107 urges first ratchet 201 generally in the direction of arrow 901. As a result of the relative motion between ratchet housing 107, ratcheting profile 415 of first ratchet 201 slidingly moves along first ratcheting profile 407 of ratchet mandrel 109. If the environmental temperature change is sufficient, ratcheting profile 415 of first ratchet 201 again engages first ratcheting profile 407 of ratchet mandrel 109, as shown in FIG. 9C.

In these ways, thermal ratchet system 101 is configured to provide and hold axial movement in one direction through a temperature cycle in a component, device, system, or the like comprising thermal ratchet system 101.

Figure 10:
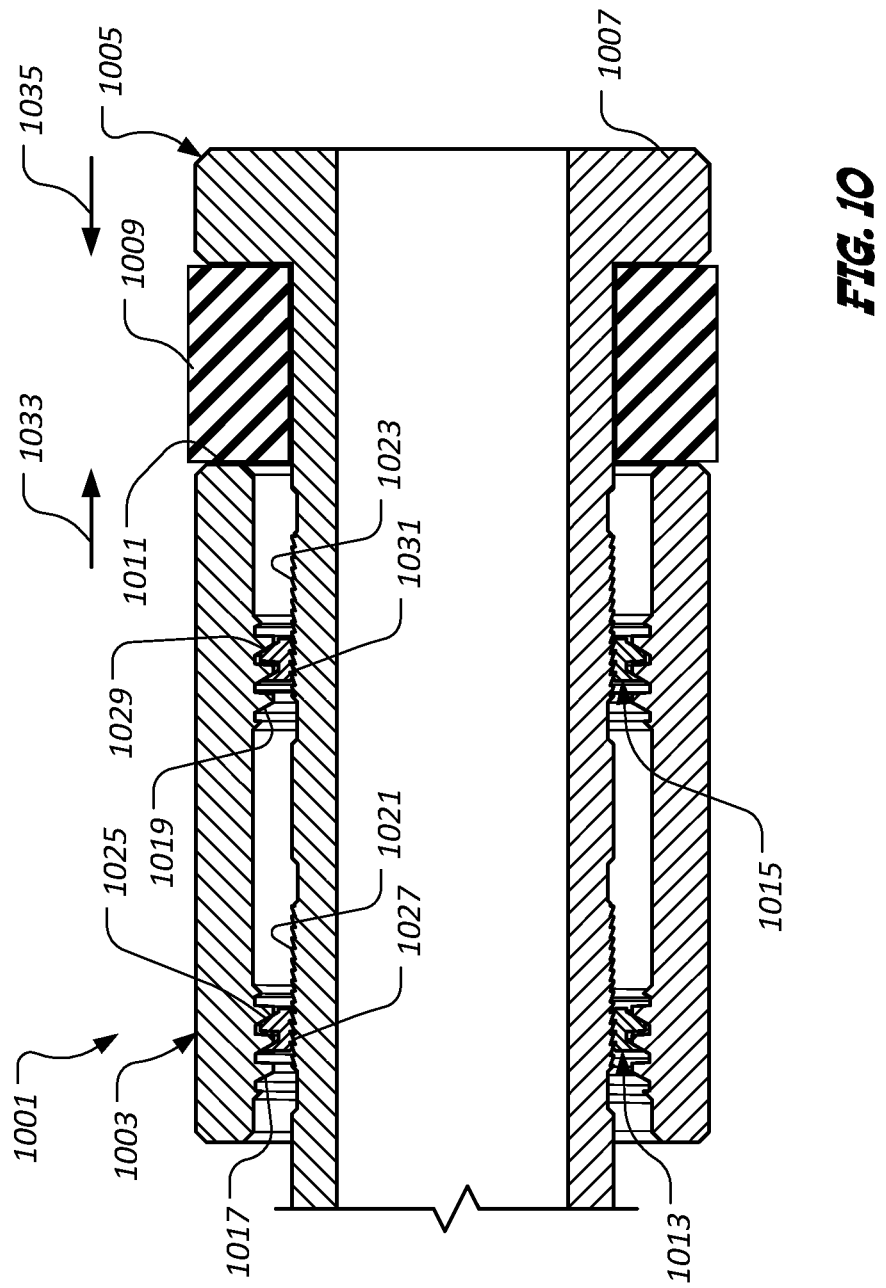
FIG. 10 is a cross-sectional view of a second illustrative embodiment of a thermal ratchet system.

The present thermal ratchet system may also be used to apply a compressive biasing force to another element, such as a sealing element. For example, as shown in FIG. 10, a second, illustrative embodiment of a thermal ratchet system 1001 is shown in a longitudinal, cross-sectional view generally corresponding to the view of FIG. 4. System 1001 comprises a ratchet housing 1003 and a ratchet mandrel 1005 comprising a material exhibiting a different coefficient of thermal expansion than the coefficient of thermal expansion exhibited by ratchet housing 1003. Ratchet mandrel 1005 defines a flange 1007. An element 1009, such as a sealing element, an energizer for a sealing element, or the like, is disposed between an end 1011 of ratchet housing 1003 and flange 1007 of ratchet mandrel 1005. As in the embodiment of FIGS. 1-5, system 1001 further comprises a first ratchet 1013 and a second ratchet 1015, each disposed between and operably associated with ratchet housing 1003 and ratchet mandrel 1005. Ratchet housing 1003 defines a first locking profile 1017 and a second locking profile 1019. Ratchet mandrel 1005 defines a first ratcheting profile 1021 and a second ratcheting profile 1023. First ratchet 1013 defines a locking profile 1025, interfaced with first locking profile 1017 of ratchet housing 1003 and a ratcheting profile 1027 interfaced with first ratcheting profile 1021 of ratchet mandrel 1005. Second ratchet 1015 defines a locking profile 1029 interfaced with second locking profile 1019 of ratchet housing 1003 and a ratcheting profile 1031 interfaced with second ratcheting profile 1023. Ratchet system 1001 operates in a fashion corresponding to that of system 101 as described herein, to move ratchet housing 1003, first ratchet 1013, and second ratchet 1015 with respect to ratchet mandrel 1005 as a result of temperature fluctuations of the environment in which system 1001 is disposed. In the illustrated embodiment, however, system 1001 is configured to impart a compressive force, as depicted by arrows 1033 and 1035. When a change in the temperature of the environment in which system 1001 is disposed causes ratchet housing 1003 to dimensionally grow with respect to ratchet mandrel 1005 or causes ratchet mandrel 1005 to dimensionally shrink with respect to ratchet housing 1003, ratchet housing 1003 moves with respect to ratchet mandrel 1005 to inhibit excessive forces being applied to element 1009. Conversely, when a change in the temperature of the environment in which system 1001 is disposed causes ratchet housing 1003 to dimensionally shrink with respect to ratchet mandrel 1005 or causes ratchet mandrel 1005 to dimensionally grow with respect to ratchet housing 1003, ratchet housing 1003 moves with respect to ratchet mandrel 1005 to maintain a compressive force on element 1009.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below. Although the present invention is shown in a limited number of forms, it is not limited to just these forms, but is amenable to various changes and modifications.

What is claimed is:

1. A thermal ratchet system, comprising:
    a ratchet housing defining a first locking profile and a second locking profile;
    a ratchet mandrel;
    a first ratchet defining a locking profile operably associated with the first locking profile of the ratchet housing and disposed at a position generally fixed with respect to the ratchet housing and urgeable with respect to the ratchet mandrel in an axial direction by a change in environmental temperature in a first direction; and
    a second ratchet defining a locking profile operably associated with the second locking profile of the ratchet housing and disposed at a position generally fixed with respect to the ratchet housing and urgeable with respect to the ratchet mandrel in the axial direction by a change in environmental temperature in a second direction opposite to the first direction;
    wherein at least one of the first ratchet and the second ratchet is engaged with the ratchet mandrel.

2. The thermal ratchet system of claim 1, wherein the ratchet mandrel is disposed in the ratchet housing.

3. The thermal ratchet system of claim 1, wherein the first ratchet and the second ratchet are disposed between the ratchet housing and the ratchet mandrel.

4. The thermal ratchet system of claim 1, wherein the ratchet housing and the ratchet mandrel define an annulus in which the first ratchet and the second ratchet are disposed.

5. The thermal ratchet system of claim 4, wherein the annulus exhibits a cross-sectional dimension greater than a cross-sectional dimension of the first ratchet and a cross-sectional dimension of the second ratchet.

6. The thermal ratchet system of claim 1, further comprising:
    an element disposed between the ratchet housing and the ratchet mandrel, such that the ratchet housing and the ratchet mandrel impart a compressive force on the element;
    wherein the compressive force imparted on the element is affected based upon at least a change in environmental temperature.

7. The thermal ratchet system of claim 6, wherein the element is one of a sealing element and an energizer for a sealing element.

8. A thermal ratchet system comprising:
    a ratchet housing comprising a material exhibiting a first coefficient of thermal expansion;
    a ratchet mandrel comprising a material exhibiting a second coefficient of thermal expansion different from the first coefficient of thermal expansion;
    a first ratchet disposed at a position generally fixed with respect to the ratchet housing and urgeable with respect to the ratchet mandrel in an axial direction by a change in environmental temperature in a first direction; and
    a second ratchet disposed at a position generally fixed with respect to the ratchet housing and urgeable with respect to the ratchet mandrel in the axial direction by a change in environmental temperature in a second direction opposite to the first direction;
    wherein at least one of the first ratchet and the second ratchet is engaged with the ratchet mandrel.

9. A thermal ratchet system comprising:
    a ratchet housing;
    a ratchet mandrel defining a first ratcheting profile and a second ratcheting profile;
    a first ratchet defining a ratcheting profile operably associated with the first ratcheting profile of the ratchet mandrel and disposed at a position generally fixed with respect to the ratchet housing and urgeable with respect to the ratchet mandrel in an axial direction by a change in environmental temperature in a first direction; and
    a second ratchet defining a ratcheting profile operably associated with the second ratcheting profile of the ratchet mandrel and disposed at a position generally fixed with respect to the ratchet housing and urgeable with respect to the ratchet mandrel in the axial direction by a change in environmental temperature in a second direction opposite to the first direction;
    wherein at least one of the first ratchet and the second ratchet is engaged with the ratchet mandrel.

10. The thermal ratchet system of claim 9, wherein:
    the first ratcheting profile of the ratchet mandrel defines a plurality of ridges canted in a first direction, and;
    the second ratcheting profile of the ratchet mandrel defines a plurality of ridges canted in the first direction.

11. The thermal ratchet system of claim 10, wherein:
    the first ratcheting profile of the ratchet mandrel further defines a plurality of valleys separating the plurality of ridges thereof;
    the ratcheting profile of the first ratchet further defines a plurality of valleys separating a plurality of ridges thereof;
    a ridge of the plurality of ridges of the first ratcheting profile of the ratchet mandrel is received in a valley of the plurality of valleys of the ratcheting profile of the first ratchet; and a ridge of the plurality of ridges of the ratcheting profile of the first ratchet is received in a valley of the plurality of valleys of the first ratcheting profile of the ratchet mandrel.

12. The thermal ratchet system of claim 11, wherein:

the second ratcheting profile of the ratchet mandrel further defines a plurality of valleys separating the plurality of ridges thereof;

the ratcheting profile of the second ratchet further defines a plurality of valleys separating a plurality of ridges thereof;

a ridge of the plurality of ridges of the second ratcheting profile of the ratchet mandrel is received in a valley of the plurality of valleys of the ratcheting profile of the second ratchet; and a ridge of the plurality of ridges of the ratcheting profile of the second ratchet is received in a valley of the plurality of valleys of the second ratcheting profile of the ratchet mandrel.

13. The thermal ratchet system of claim 10, wherein:

the ratcheting profile of the first ratchet defines a plurality of ridges canted in a second direction that is generally counter to the first direction; and the ratcheting profile of the second ratchet defines a plurality of ridges canted in the second direction.

* * * * *